(12) United States Patent
Yoo et al.

(10) Patent No.: US 10,471,805 B2
(45) Date of Patent: Nov. 12, 2019

(54) AIR CONDITIONING SYSTEM FOR MOTOR VEHICLES AND CONTROL METHOD THEREOF

(71) Applicant: Halla Visteon Climate Control Corp., Daejeon (KR)

(72) Inventors: Sang Jun Yoo, Daejeon (KR); Se Won Min, Daejeon (KR); Chang Hyun Baek, Daejeon (KR); Hong Rae Jung, Daejeon (KR)

(73) Assignee: HANON SYSTEMS, Daejeon-si (KR)

( * ) Notice: Subject to any disclaimer, the term of this patent is extended or adjusted under 35 U.S.C. 154(b) by 1067 days.

(21) Appl. No.: 14/707,457

(22) Filed: May 8, 2015

(65) Prior Publication Data

US 2015/0321537 A1 Nov. 12, 2015

(30) Foreign Application Priority Data

May 9, 2014 (KR) .................. 10-2014-0055506
Apr. 21, 2015 (KR) .................. 10-2015-0055954

(51) Int. Cl.
*B60H 1/22* (2006.01)
*F24H 9/18* (2006.01)
*F24H 3/04* (2006.01)
*B60H 1/00* (2006.01)

(52) U.S. Cl.
CPC ..... *B60H 1/00835* (2013.01); *B60H 1/00735* (2013.01); *B60H 1/2218* (2013.01); *F24H 3/0429* (2013.01); *F24H 9/1872* (2013.01)

(58) Field of Classification Search
CPC . F24H 3/0429; F24H 9/1872; B60H 1/00835; B60H 1/2218; B60H 1/00735
See application file for complete search history.

(56) References Cited

U.S. PATENT DOCUMENTS

| 5,831,803 | A | * | 11/1998 | Wynn | ............... | H02H 3/025 361/7 |
| 2012/0238197 | A1 | * | 9/2012 | Katagiri | ............ | B60H 1/00842 454/152 |
| 2014/0117104 | A1 | * | 5/2014 | Inaba | ................. | B60H 1/00899 237/28 |
| 2015/0122473 | A1 | * | 5/2015 | Nii | .................... | B60H 1/0005 165/202 |

* cited by examiner

*Primary Examiner* — Jianying C Atkisson
*Assistant Examiner* — Meraj A Shaikh
(74) *Attorney, Agent, or Firm* — Shumaker, Loop & Kendrick, LLP; James D. Miller (57) ABSTRACT

An air conditioning system for motor vehicles includes a temperature door configured to adjust an opening degree of a hot air path, a PTC heater configured to heat an air introduced into the hot air path, and a control unit configured to control an opening position of the temperature door with respect to the hot air path and to secure a minimum opening degree of the hot air path, so that a minimum amount of air is blown toward the PTC heater regardless of the opening position of the temperature door. The control unit is configured to actively adjust the minimum opening degree of the hot air path depending on an on/off condition of the PTC heater.

15 Claims, 7 Drawing Sheets

AIR CONDITIONING SYSTEM FOR MOTOR VEHICLES AND CONTROL METHOD THEREOF

CROSS-REFERENCE TO RELATED APPLICATIONS

This application claims priority to Korean Patent Application No. 10-2014-0055506 filed on May 9, 2014 and Korean Patent Application No. 10-2015-0055954 filed on Apr. 21, 2015, the disclosures of which are incorporated herein by reference in their entirety.

FIELD OF THE INVENTION

The present invention relates to an air conditioning system for motor vehicles and a control method thereof. More particularly, the present invention pertains to an air conditioning system for motor vehicles capable of efficiently managing the overheating of a positive temperature coefficient (PTC) heater by employing a configuration in which the minimum opening degree of a hot air path is actively controlled depending on the on/off condition of the PTC heater while securing the minimum opening degree of the hot air path to prevent the overheating the PTC heater.

BACKGROUND ART

In a hybrid vehicle or an electric vehicle, an engine is limitedly used or not used. Thus, engine cooling water required for heating a vehicle room may be insufficient or may not be obtained.

Accordingly, an air conditioning system for a hybrid vehicle or an electric vehicle (hereinafter generally referred to as a "motor vehicle") employs a heating device capable of heating a vehicle room without engine cooling water. As one example, there is available a heating device that makes use of a positive temperature coefficient (PTC) heater.

Figure 1:
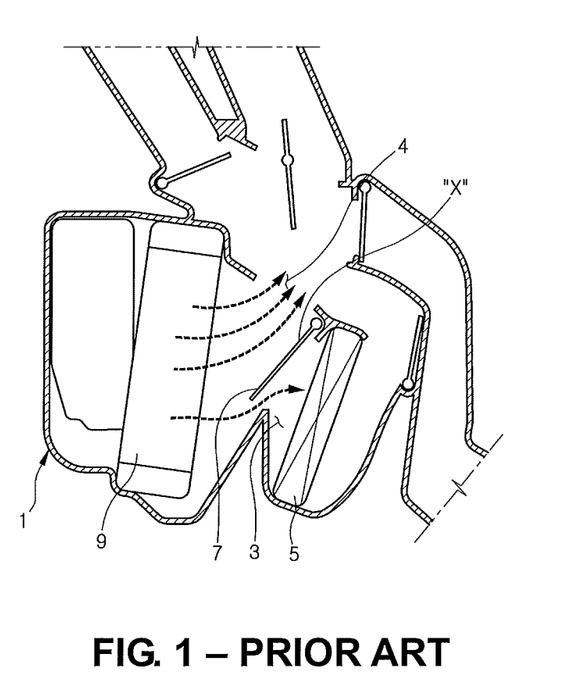
FIG. 1 is a view showing a conventional air conditioning system for motor vehicles.

As shown in FIG. 1, the heating device using the PTC heater has a structure in which a PTC heater 5 is installed in a hot air path 3 of an air conditioner case 1. The PTC heater 5 is a high-voltage heater, the heat generation amount of which is adjusted by the control of a pulse width modulation (PWM) duty ratio.

In the PTC heater 5, a specific target heating temperature is set. If a PWM duty ratio corresponding to the target heating temperature is applied to the PTC heater 5, the PTC heater 5 generates heat in conformity with the PWM duty ratio thus applied. Thus, the PTC heater 5 heats the air blown into a vehicle room while being controlled in conformity with the target heating temperature. In this way, the PTC heater 5 heats the vehicle room.

In the conventional air conditioning system mentioned above, if the opening degree of the hot air path 3 is sharply reduced in the course of operating (turning on) the PTC heater 5, the volume of the air passing through the PTC heater 5 decreases. In this case, the heat exchange amount of the PTC heater 5 is reduced and the heating temperature of the PTC heater 5 is rapidly increased. This poses a problem in that the PTC heater 5 is overheated.

Particularly, when the temperature door 7 is moved to a maximum cooling position X to minimize the opening degree of the hot air path 3, the volume of the air passing through the PTC heater 5 is significantly reduced. In this case, the heating temperature of the PTC heater 5 is sharply increased. Thus, the PTC heater 5 may be overheated. This may pose a problem in that the PTC heater 5 is thermally deformed or damaged and the air conditioner case 1 existing around the PTC heater 5 is also thermally deformed or damaged.

In view of the above problem, there has been proposed a technique which prevents the overheating of the PTC heater 5 by controlling the temperature door 7 so as not to be completely closed and allowing a minimum amount of air to be blown toward the PTC heater 5. In this technique, the temperature door 7 is controlled such that a minimum opening degree of the hot air path 3 is secured even if the temperature door 7 is moved to the maximum cooling position X. This enables a minimum amount of air to be blown toward the PTC heater 5, thereby preventing the overheating of the PTC heater 5.

However, the conventional technique mentioned above is configured such that the hot air path 3 is opened at a minimum level regardless of the on/off condition of the PTC heater 5. Thus, there may be a case where the hot air path 3 is unnecessarily opened even when the PTC heater 5 is turned off. This may pose a problem in that the air coming from an evaporator 9 is unnecessarily introduced into the hot air path 3.

The air coming from the evaporator 9 should unnecessarily pass through the PTC heater 5 installed in the hot air path 3. This may generate an unnecessary air resistance. As a result, the cooling and heating efficiency of the vehicle room is reduced.

In the conventional technique, a minimum opening degree of the hot air path 3 is secured in order to prevent the overheating of the PTC heater 5. Therefore, the air is introduced into the hot air path 3 even when the PTC heater 5 is turned off. In order to minimize the unnecessary air introduction into the hot air path 3 when the PTC heater 5 is turned off, it is necessary to limit the minimum opening degree of the hot air path 3.

In the case where the heating temperature of the PTC heater 5 is increased to such a level that the overheating probability of the PTC heater 5 is very high, for example, in the case where the target heating temperature of the PTC heater 5 is very high and the possibility of overheating of the PTC heater 5 is very high, the limited minimum opening degree of the hot air path 3 cannot cope with the overheating of the PTC heater 5.

Thus, even if a minimum air volume is secured to prevent the overheating of the PTC heater 5, it is impossible to prevent the overheating of the PTC heater 5.

SUMMARY OF THE INVENTION

In view of the above-noted problems, it is an object of the present invention to provide an air conditioning system for motor vehicles and a control method thereof which can actively adjust a minimum opening degree of a hot air path depending on the on/off condition of a PTC heater.

Another object of the present invention is to provide an air conditioning system for motor vehicles and a control method thereof which can prevent a hot air path from being unnecessarily opened when a PTC heater is turned off, by employing a configuration in which a minimum opening degree of a hot air path is actively adjusted depending on the on/off condition of a PTC heater.

A further object of the present invention is to provide an air conditioning system for motor vehicles and a control method thereof which can prevent an evaporator side air from being unnecessarily introduced into a hot air path, by employing a configuration in which a hot air path is prevented from being unnecessarily opened when a PTC heater is turned off.

A still further object of the present invention is to provide an air conditioning system for motor vehicles and a control method thereof which can prevent generation of an unnecessary air resistance caused by air introduction into a hot air path and resultant reduction of the cooling and heating efficiency of a vehicle room, by employing a configuration in which an evaporator side air is prevented from being unnecessarily introduced into a hot air path.

A yet still further object of the present invention is to provide an air conditioning system for motor vehicles and a control method thereof which can, when a PTC heater is turned off, freely set a minimum opening degree of a hot air path regardless of the unnecessary introduction of an air into the hot air path, by employing a configuration in which the unnecessary opening of the hot air path and the unnecessary introduction of an air into the hot air path are prevented when the PTC heater is turned off.

An even yet still further object of the present invention is to provide an air conditioning system for motor vehicles and a control method thereof which can increase a minimum opening degree of a hot air path when the heating temperature of a PTC heater and the overheating probability thereof are high, by employing a configuration in which, when the PTC heater is turned off, a minimum opening degree of a hot air path can be freely set regardless of the unnecessary introduction of an air into the hot air path.

An additionally even yet still further object of the present invention is to provide an air conditioning system for motor vehicles and a control method thereof which can positively cope with the increase of the heating temperature of a PTC heater and the overheating probability thereof and can reliably prevent the overheating of the PTC heater, by employing a configuration in which a minimum opening degree of a hot air path can be increased when the heating temperature of the PTC heater and the overheating probability thereof are high.

In one aspect of the present invention, there is provided an air conditioning system for motor vehicles, including: a temperature door configured to adjust an opening degree of a hot air path; a PTC heater configured to heat an air introduced into the hot air path; and a control unit configured to control an opening position of the temperature door with respect to the hot air path and to secure a minimum opening degree of the hot air path, so that a minimum amount of air is blown toward the PTC heater regardless of the opening position of the temperature door, wherein the control unit is configured to actively adjust the minimum opening degree of the hot air path depending on an on/off condition of the PTC heater.

The control unit may be configured to, when the PTC heater is turned on, control the opening position of the temperature door with respect to the hot air path so as to secure the minimum opening degree of the hot air path and may be configured to, when the PTC heater is turned off, control the opening position of the temperature door with respect to the hot air path so as not to secure the minimum opening degree of the hot air path.

The PTC heater may be configured to, if a PWM duty ratio corresponding to a predetermined target heating temperature is applied to the PTC heater, be turned on and heated to the predetermined target heating temperature, and the control unit may be configured to, when the PTC heater is turned on, control the opening position of the temperature door so that the minimum opening degree of the hot air path is set at such a level as to prevent overheating of the PTC heater controlled at a highest target heating temperature.

In another aspect of the present invention, there is provided a control method of an air conditioning system for motor vehicles, the air conditioning system including a temperature door configured to adjust an opening degree of a hot air path and a PTC heater configured to heat an air introduced into the hot air path, the method including: a) a step of determining when the PTC heater is turned on or off; and b) a step of controlling the temperature door so that a minimum opening degree of the temperature door with respect to the hot air path is adjusted depending on an on/off condition of the PTC heater.

At the step b), the temperature door may be controlled so that the minimum opening degree of the temperature door is secured if the PTC heater is turned on and so that the minimum opening degree of the temperature door is not secured if the PTC heater is turned off.

According to the air conditioning system for motor vehicles and the control method thereof, the minimum opening degree of the hot air path can be actively adjusted depending on the on/off condition of the PTC heater. It is therefore possible to prevent the hot air path from being unnecessarily opened when the PTC heater is turned off.

Since the unnecessary opening of the hot air path can be prevented when the PTC heater is turned off, it is possible to prevent the evaporator side air from being unnecessarily introduced into the hot air path.

Since the unnecessary introduction of the evaporator side air into the hot air path can be prevented, it is possible to prevent generation of an unnecessary air resistance caused by the air introduction into the hot air path and resultant reduction of the cooling and heating efficiency of a vehicle room.

Since the unnecessary opening of the hot air path and the unnecessary introduction of the air into the hot air path can be prevented when the PTC heater is turned off, it is possible to, when the PTC heater is turned off, freely set the minimum opening degree of the hot air path regardless of the unnecessary introduction of the air into the hot air path.

Since the minimum opening degree of the hot air path can be freely set regardless of the unnecessary introduction of the air into the hot air path when the PTC heater is turned off, it is possible to increase the minimum opening degree of the hot air path when the heating temperature of the PTC heater and the overheating probability thereof are high.

Since the minimum opening degree of the hot air path can be increased when the heating temperature of the PTC heater and the overheating probability thereof are high, it is possible to positively cope with the increase of the heating temperature of the PTC heater and the overheating probability thereof and to reliably prevent the overheating of the PTC heater.

Since the minimum opening degree of the temperature door is actively and variably controlled depending on the single mode and the dual mode of the air conditioning system, it is possible to effectively prevent the overheating of the PTC heater regardless of the mode of the air conditioning system.

Since the rotation speed of the blower is increased when there is a possibility of overheating of the PTC heater, it is possible to reliably prevent the overheating of the PTC heater.

BRIEF DESCRIPTION OF THE DRAWINGS

The above and other objects and features of the present invention will become apparent from the following description of preferred embodiments given in conjunction with the accompanying drawings.

FIG. 2 is a view illustrating an air conditioning system for motor vehicles according to a first embodiment of the present invention, in which there are shown an opening position of a temperature door and a minimum opening degree of a hot air path when a PTC heater is turned on.

DETAILED DESCRIPTION OF THE PREFERRED EMBODIMENTS

Some preferred embodiments of an air conditioning system for motor vehicles and a control method thereof according to the present invention will now be described in detail with reference to the accompanying drawings. Components similar to those of the prior art described earlier will be designated by like reference symbols.

First Embodiment

Prior to describing features of an air conditioning system for motor vehicles according to the present invention, the general configuration of the air conditioning system will be briefly described with reference to FIG. 2.

The air conditioning system includes an air conditioner case 1 and a PTC heater 5 installed in a hot air path 3 of the air conditioner case 1. The PTC heater 5 is a heater, the heat generation amount of which is adjusted by the control of a pulse width modulation (PWM) duty ratio. In the PTC heater 5, a specific target heating temperature is set. If a PWM duty ratio corresponding to the target heating temperature is applied to the PTC heater 5, the PTC heater 5 generates heat in conformity with the PWM duty ratio thus applied. Thus, the PTC heater 5 heats the air blown into a vehicle room while being controlled in conformity with the target heating temperature. In this way, the PTC heater 5 heats the vehicle room.

The air conditioning system further includes a temperature door 7 installed between the hot air path 3 and the cold air path 4 of the air conditioner case 1. The temperature door 7 makes rotational movement between the hot air path 3 and the cold air path 4 and adjusts the opening degree of each of the hot air path 3 and the cold air path 4, thereby controlling the temperature of the air blown into the vehicle room.

Next, the features of the air conditioning system according to the present invention will be described in detail with reference to FIGS. 2 and 3.

Figure 2:
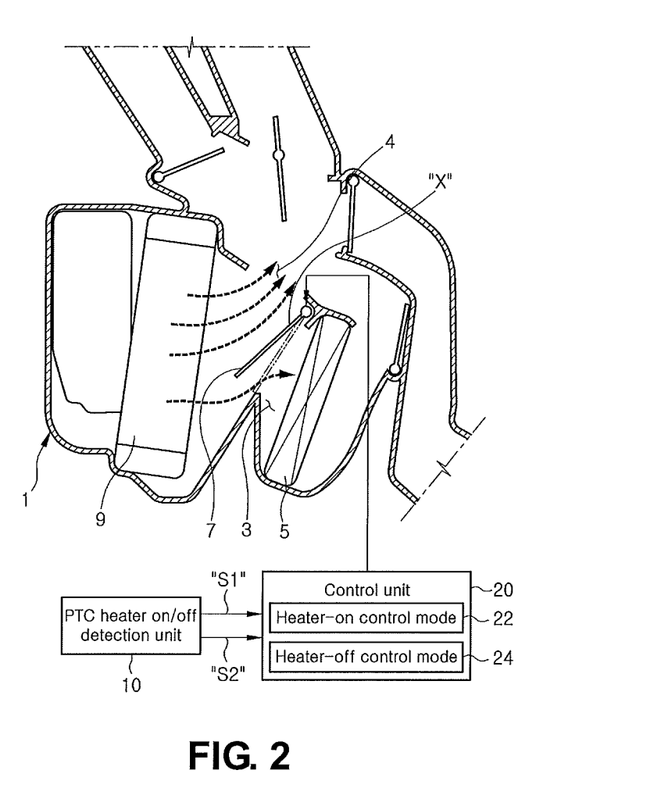

Referring first to FIG. 2, the air conditioning system according to the present invention includes a PTC heater on/off detection unit 10 for detecting an on-state and an off-state of the PTC heater 5. The PTC heater on/off detection unit 10 includes a voltage sensor (not shown) for detecting a voltage applied to the PTC heater 5.

The voltage sensor detects whether a voltage is applied to the PTC heater 5. If a voltage is applied to the PTC heater 5, the voltage sensor outputs a heater-on signal S1. If a voltage is not applied to the PTC heater 5, the voltage sensor outputs a heater-off signal S2. Thus, the voltage sensor can detect the on-state and off-state of the PTC heater 5.

The air conditioning system according to the present invention further includes a control unit 20 for controlling the temperature door 7 pursuant to the heater-on signal S1 or the heater-off signal S2 inputted from the PTC heater on/off detection unit 10. The control unit 20 is provided with a microprocessor. If the heater-on signal S1 is inputted from the PTC heater on/off detection unit 10, the control unit 20 enters a heater-on control mode 22. In the heater-on control mode 22, the control unit 20 determines that the PTC heater 5 is in an on-state and is susceptible to overheating.

Particularly, if the PTC heater 5 is turned on and if the opening degree of the hot air path 3 is reduced, the control unit 20 recognizes that the possibility of overheating of the PTC heater 5 is very high and determines that there is a need to secure the minimum opening degree of the hot air path 3.

Upon making this determination, the control unit 20 limits the opening position of the temperature door 7 with respect to the hot air path 3 so as to secure the minimum opening degree of the hot air path 3. Particularly, the control unit 20 controls the temperature door 7 so that the hot air path 3 is opened at a predetermined degree even when the temperature door 7 is controlled to move toward a maximum cooling position X and is moved in such a direction as to close the hot air path 3.

Accordingly, the minimum opening degree of the hot air path 3 is secured, whereby a minimum amount of air is blown toward the PTC heater 5. As a result, it is possible to prevent the PTC heater 5 from being overheated.

When the PTC heater 5 is turned on, the control unit 20 secures the minimum opening degree of the hot air path 3 by controlling the opening position of the temperature door 7 and sets the minimum opening degree of the hot air path 3 in conformity with the PTC heater 5 controlled at the highest target heating temperature.

Accordingly, even if the PTC heater 5 is controlled at the highest target heating temperature, the overheating of the PTC heater 5 can be sufficiently prevented by securing the minimum opening degree of the hot air path 3 as mentioned above.

Referring again to FIGS. 2 and 3, if a heater-off signal S2 is inputted from the PTC heater on/off detection unit 10, the control unit 20 enters a heater-off control mode 24.

In the heater-off control mode 24, the control unit 20 recognizes that the PTC heater 5 is turned off and the possibility of overheating of the PTC heater 5 does not exist. Based on this recognition, the control unit 20 determines that there is no need to secure the minimum opening degree of the hot air path 3.

Upon making this determination, the control unit 20 controls the opening position of the temperature door 7 with respect to the hot air path 3 so that the minimum opening degree of the hot air path 3 is not secured. Particularly, as shown in FIG. 3, the control unit 20 controls the temperature door 7 so that the temperature door 7 moves toward the maximum cooling position X and completely closes the hot air path 3.

Accordingly, it is possible to prevent the hot air path 3 from being unnecessarily opened when the PTC heater 5 is turned off. This makes it possible to prevent the air existing at the side of an evaporator 9 from being unnecessarily introduced into the hot air path 3.

As a result, it is possible to reliably prevent the unnecessary introduction of an air into the hot air path 3, the resultant generation of an unnecessary air resistance, and the reduction of the cooling and heating efficiency of a vehicle room otherwise caused by the unnecessary air resistance.

Next, an operation example of the air conditioning system configured as above will be described in detail with reference to FIGS. 2 to 4.

Figure 4:
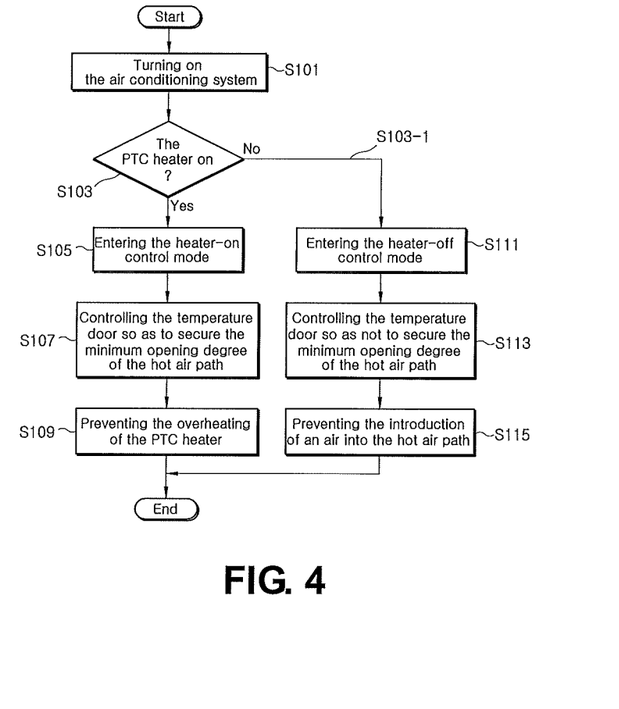
FIG. 4 is a flowchart illustrating an operation example of the air conditioning system for motor vehicles according to the first embodiment of the present invention.

Referring first to FIG. 4, the air conditioning system is turned on (at S101). In this state, determination is made as to whether the PTC heater 5 is turned on (at S103).

If it is determined that the PTC heater 5 is turned on, the control unit 20 enters the heater-on control mode 22 (at S105). In the heater-on control mode 22, the control unit 20 limits the opening position of the temperature door 7 with respect to the hot air path 3 so as to secure the minimum opening degree of the hot air path 3 (at S107).

Thus, as shown in FIG. 2, the hot air path 3 is opened at a predetermined degree even when the temperature door 7 is controlled to move toward the maximum cooling position X and is moved in such a direction as to close the hot air path 3.

Consequently, the minimum opening degree of the hot air path 3 is secured. As a result, a minimum amount of air is blown toward the PTC heater 5, thereby preventing the overheating of the PTC heater 5 (at S109).

Referring again to FIG. 4, if it is determined at step S103 that the PTC heater 5 is not turned on (at S103-1), namely that the PTC heater 5 is turned on, the control unit 20 enters the heater-off control mode 24 (at S111). In the heater-off control mode 24, the control unit 20 controls the opening position of the temperature door 7 with respect to the hot air path 3 so that the minimum opening degree of the hot air path 3 is not secured (at S113).

Figure 3:
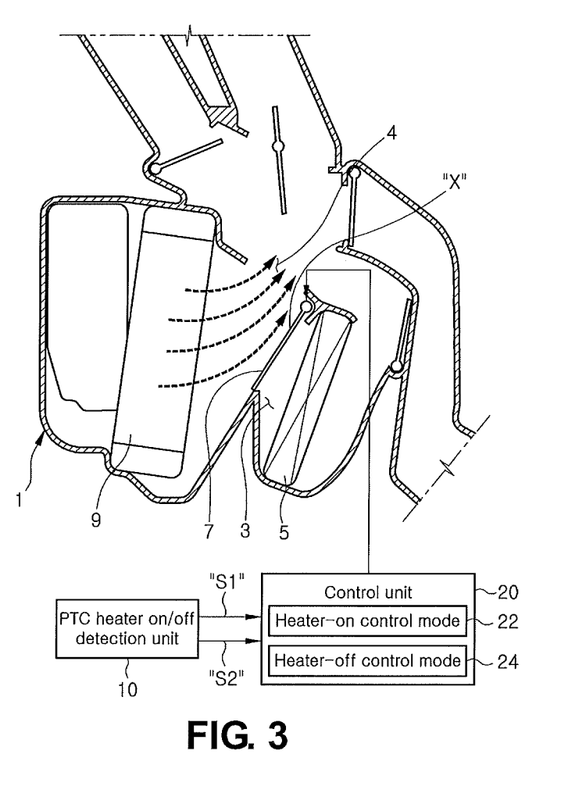
FIG. 3 is a view illustrating an operation example of the air conditioning system for motor vehicles according to the first embodiment of the present invention, in which there are shown an opening position of a temperature door and a minimum opening degree of a hot air path when a PTC heater is turned off.

Thus, as shown in FIG. 3, the temperature door 7 completely closes the hot air path 3 when the temperature door 7 is controlled to move toward the maximum cooling position X and is moved in such a direction as to close the hot air path 3.

Accordingly, it is possible to prevent unnecessary opening of the hot air path 3 when the PTC heater 5 is turned off. As a result, it is possible to prevent the air existing at the side of the evaporator 9 from being introduced into the hot air path 3 (at S115).

According to the air conditioning system of the first embodiment, the minimum opening degree of the hot air path 3 can be actively adjusted depending on the on/off state of the PTC heater 5. It is therefore possible to prevent the hot air path 3 from being unnecessarily opened when the PTC heater 5 is turned off.

Since the unnecessary opening of the hot air path 3 can be prevented when the PTC heater 5 is turned off, it is possible to prevent the air existing at the side of the evaporator 9 from being unnecessarily introduced into the hot air path 3.

Since the unnecessary introduction of the evaporator side air into the hot air path 3 can be prevented, it is possible to reliably prevent generation of an unnecessary air resistance caused by the air introduction into the hot air path 3 and resultant reduction of the cooling and heating efficiency of a vehicle room.

Since the unnecessary opening of the hot air path 3 and the unnecessary introduction of the air into the hot air path 3 can be prevented when the PTC heater 5 is turned off, it is possible to, when the PTC heater 5 is turned off, freely set the minimum opening degree of the hot air path 3 regardless of the unnecessary introduction of the air into the hot air path 3.

Since the minimum opening degree of the hot air path 3 can be freely set regardless of the unnecessary introduction of the air into the hot air path 3 when the PTC heater 5 is turned off, it is possible to increase the minimum opening degree of the hot air path 3 when the heating temperature of the PTC heater 5 and the overheating probability thereof are high.

Since the minimum opening degree of the hot air path 3 can be increased when the heating temperature of the PTC heater 5 and the overheating probability thereof are high, it is possible to positively cope with the increase of the heating temperature of the PTC heater 5 and the overheating probability thereof and to reliably prevent the overheating of the PTC heater 5.

Second Embodiment

Figure 5:
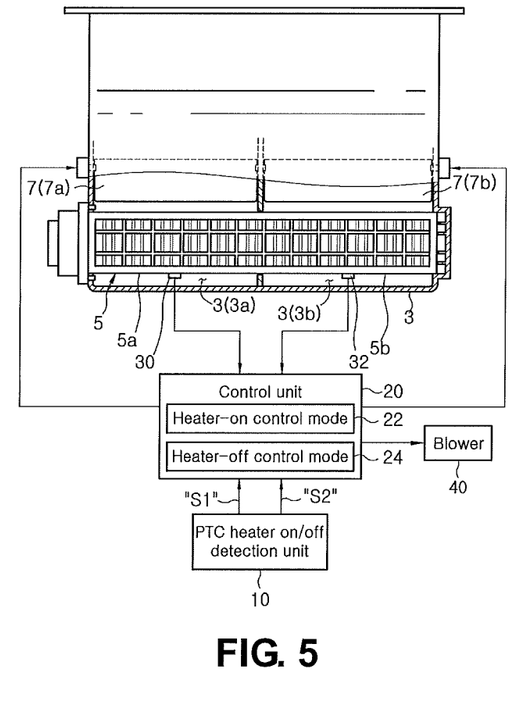
FIG. 5 is a view showing an air conditioning system for motor vehicles according to a second embodiment of the present invention.

Next, an air conditioning system for motor vehicles according to a second embodiment of the present invention will be described with reference to FIG. 5. FIG. 5 shows the air conditioning system for motor vehicles according to the second embodiment of the present invention.

The air conditioning system according to the second embodiment is a dual-zone-type air conditioning system which independently cools or heats a driver seat zone and a passenger seat zone.

In the case of the dual-zone-type air conditioning system, the control unit 20 is configured to secure the minimum opening degree of the hot air path 3 by controlling the opening position of the temperature door 7 depending on the heater-on signal S1 of the PTC heater on/off detection unit 10 and is configured to vary the minimum opening degree of the hot air path 3 depending on whether the air conditioning system is in a single mode or in a dual mode.

More specifically, the control unit 20 controls a driver-seat-side temperature door 7a and a passenger-seat-side temperature door 7b so that the minimum opening degree of the driver-seat-side temperature door 7a and the passenger-seat-side temperature door 7b in the single mode in which the driver-seat-side temperature door 7a and the passenger-seat-side temperature door 7b are simultaneously controlled differs from the minimum opening degree of the driver-seat-side temperature door 7a and the passenger-seat-side temperature door 7b in the dual mode in which the driver-seat-side temperature door 7a and the passenger-seat-side temperature door 7b are independently controlled.

The reason is that the heating temperature of the PTC heater 5 in the single mode differs from the heating temperature of the PTC heater 5 in the dual mode.

By actively and variably controlling the minimum opening degree of the driver-seat-side temperature door 7a and the passenger-seat-side temperature door 7b depending on the single mode and the dual mode in which the PTC heater 5 operated at different heating temperatures, it is possible to effectively control the overheating of the PTC heater 5.

Preferably, the control unit 20 controls the driver-seat-side temperature door 7a and the passenger-seat-side temperature door 7b so that the minimum opening degree of the driver-seat-side temperature door 7a and the passenger-seat-side temperature door 7b in the single mode becomes larger than the minimum opening degree of the driver-seat-side temperature door 7a and the passenger-seat-side temperature door 7b in the dual mode.

The reason is that the heating temperature of the PTC heater 5 in the single mode is controlled to become higher than the heating temperature of the PTC heater 5 in the dual mode.

By controlling the driver-seat-side temperature door 7a and the passenger-seat-side temperature door 7b so that the minimum opening degree of the driver-seat-side temperature door 7a and the passenger-seat-side temperature door 7b in the single mode becomes larger than the minimum opening degree of the driver-seat-side temperature door 7a and the passenger-seat-side temperature door 7b in the dual mode, it is possible to effectively control the overheating of the PTC heater 5 in the single mode.

Referring again to FIG. 5, the air conditioning system according to the second embodiment includes a first heater sensor 30 and a second heater sensor 32 which are installed in the PTC heater 5.

The first heater sensor 30 is installed in the portion 5a of the PTC heater 5 corresponding to a driver-seat-side hot air path 3a. The first heater sensor 30 detects the temperature of the portion 5a of the PTC heater 5 corresponding to the driver-seat-side hot air path 3a and inputs the detected temperature data to the control unit 20.

The second heater sensor 32 is installed in the portion 5b of the PTC heater 5 corresponding to a passenger-seat-side hot air path 3b. The second heater sensor 32 detects the temperature of the portion 5b of the PTC heater 5 corresponding to the passenger-seat-side hot air path 3b and inputs the detected temperature data to the control unit 20.

If the temperature data of the PTC heater 5 are inputted from the first heater sensor 30 and the second heater sensor 32, namely if the temperature of the portion 5a of the PTC heater 5 corresponding to the driver-seat-side hot air path 3a and the temperature of the portion 5b of the PTC heater 5 corresponding to the passenger-seat-side hot air path 3b are inputted from the first heater sensor 30 and the second heater sensor 32, the control unit 20 compares the inputted temperatures with each other.

If the inputted temperature of the portion 5a of the PTC heater 5 corresponding to the driver-seat-side hot air path 3a and the inputted temperature of the portion 5b of the PTC heater 5 corresponding to the passenger-seat-side hot air path 3b differ from each other, the control unit 20 determines whether the higher one of the inputted temperatures is equal to or higher than a reference temperature. If it is determined that the higher one of the inputted temperatures is equal to or higher than the reference temperature, the control unit 20 recognizes that the PTC heater 5 is overheated despite the securement of the minimum opening degree of the driver-seat-side temperature door 7a and the passenger-seat-side temperature door 7b.

Based on this recognition, the control unit 20 increases the rotation speed of a blower 40 by a predetermined rotation speed value, thereby increasing the volume and pressure of the air blown toward the PTC heater 5. This makes it possible to increase the heat exchange amount of the PTC heater 5 with the air and to reliably prevent the overheating of the PTC heater 5.

Figure 6:
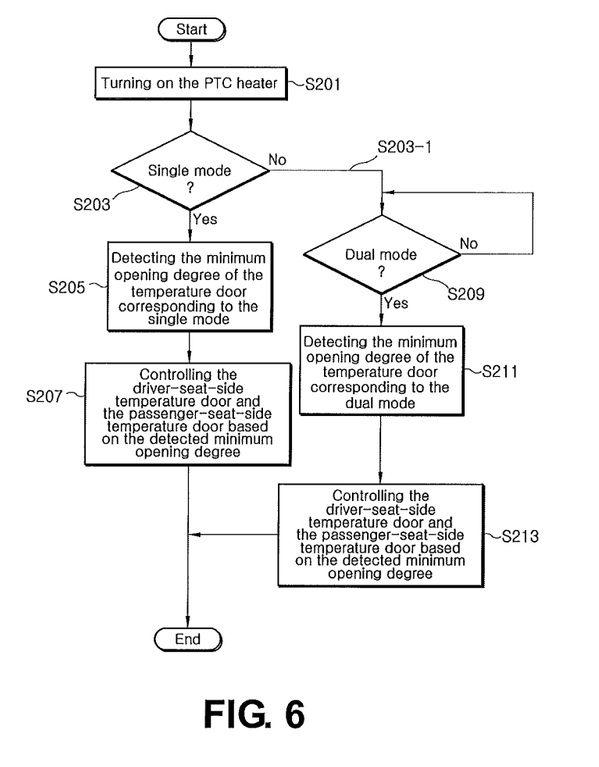
FIGS. 6 and 7 are flowcharts illustrating operation examples of the air conditioning system for motor vehicles according to the second embodiment.
Figure 7:
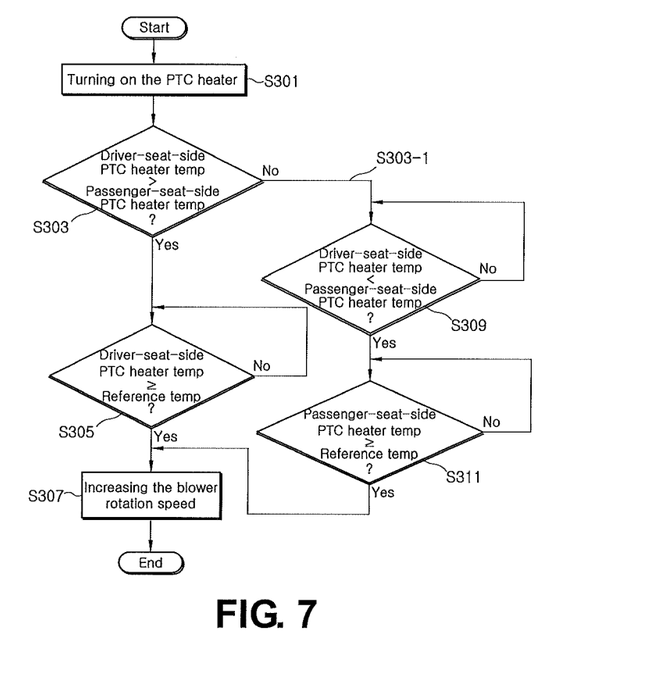

Next, an operation example of the air conditioning system of the second embodiment configured as above will be described in detail with reference to FIGS. 6 and 7.

First, an operation example of actively and variably controlling the minimum opening degree of the temperature door 7 depending on whether the air conditioning system is in the single mode or in the dual mode will be described with reference to FIG. 6.

The PTC heater 5 is turned on (at S201). In this state, determination is made as to whether the air conditioning system is in the single mode (at S203). If it is determined that the air conditioning system is in the single mode, the control unit 20 detects the minimum opening degree of the temperature door 7 corresponding to the single mode (at S205) and controls the minimum opening degree of the driver-seat-side temperature door 7a and the passenger-seat-side temperature door 7b in conformity with the minimum opening degree of the temperature door 7 thus detected (at S207). Thus, the driver-seat-side temperature door 7a and the passenger-seat-side temperature door 7b are controlled in conformity with the minimum opening degree of the single mode. This makes it possible to prevent the overheating of the PTC heater 5 in the single mode.

On the other hand, if it is determined that the air conditioning system is not in the single mode (at S203-1), the control unit 20 determines whether the air conditioning system is in the dual mode (at S209). If it is determined that the air conditioning system is in the dual mode, the control unit 20 detects the minimum opening degree of the temperature door 7 corresponding to the dual mode (at S211) and controls the minimum opening degree of the driver-seat-side temperature door 7a and the passenger-seat-side temperature door 7b in conformity with the minimum opening degree of the temperature door 7 thus detected (at S213). Thus, the driver-seat-side temperature door 7a and the passenger-seat-side temperature door 7b are controlled in conformity with the minimum opening degree of the dual mode. This makes it possible to prevent the overheating of the PTC heater 5 in the dual mode.

Next, an operation example of increasing the rotation speed of the blower 40 when there is a possibility of overheating of the PTC heater 5 will be described with reference to FIG. 7.

First, the PTC heater 5 is turned on (at S301). Then, determination is made as to whether the temperature of the driver-seat-side portion of the PTC heater 5 is higher than the temperature of the passenger-seat-side portion of the PTC heater 5 (at S303). If it is determined that the temperature of the driver-seat-side portion of the PTC heater 5 is higher than the temperature of the passenger-seat-side portion of the PTC heater 5, the control unit 20 determines whether the temperature of the driver-seat-side portion of the PTC heater 5 is equal to or higher than a reference temperature (at S305).

If it is determined that the temperature of the driver-seat-side portion of the PTC heater 5 is equal to or higher than the reference temperature, the control unit 20 recognizes that the PTC heater 5 is overheated and increases the rotation speed of the blower 40 by a predetermined rotation speed value (S307).

Thus, the volume and pressure of the air blown toward the PTC heater 5 are increased to promote the heat exchange of the PTC heater 5 with the air. This makes it possible to reliably prevent the overheating of the PTC heater 5.

On the other hand, if it is determined that the temperature of the driver-seat-side portion of the PTC heater 5 is not higher than the temperature of the passenger-seat-side portion of the PTC heater 5 (at S303-1), the control unit 20 determines whether the temperature of the passenger-seat-side portion of the PTC heater 5 is higher than the temperature of the driver-seat-side portion of the PTC heater 5 (at S309).

If it is determined that the temperature of the passenger-seat-side portion of the PTC heater 5 is higher than the temperature of the driver-seat-side portion of the PTC heater 5, the control unit 20 determines whether the temperature of the passenger-seat-side portion of the PTC heater 5 is equal to or higher than a reference temperature (S311).

If it is determined that the temperature of the passenger-seat-side portion of the PTC heater 5 is equal to or higher than the reference temperature, the control unit 20 recognizes that the PTC heater 5 is overheated and increases the rotation speed of the blower 40 by a predetermined rotation speed value (S307).

Thus, the volume and pressure of the air blown toward the PTC heater 5 are increased to promote the heat exchange of the PTC heater 5 with the air. This makes it possible to reliably prevent the overheating of the PTC heater 5.

According to the air conditioning system of the second embodiment configured as above, the minimum opening degree of the temperature door 7 is actively and variably controlled depending on the single mode and the dual mode of the air conditioning system. It is therefore possible to effectively prevent the overheating of the PTC heater 5 regardless of the mode of the air conditioning system.

Since the rotation speed of the blower 40 is increased when there is a possibility of overheating of the PTC heater 5, it is possible to reliably prevent the overheating of the PTC heater 5.

While some preferred embodiments of the present invention have been described above, the present invention is not limited to these embodiments. It is to be understood that various changes and modifications may be made without departing from the scope of the invention defined in the claims.

What is claimed is:

1. An air conditioning system for a motor vehicle, comprising:
    a door configured to adjust an opening degree of a hot air path between an open state and a closed state;
    a positive temperature coefficient (PTC) heater configured to heat air introduced into the hot air path; and
    a controller configured to operate the door to adjust the opening degree of the hot air path between the open state and the closed state, wherein the controller is programmed to operate the door to adjust the opening degree of the hot air path between the open state and a predetermined opening degree in response to the controller determining that the PTC heater is operating, wherein the predetermined opening degree allows a predetermined amount of air to be introduced into the hot air path to prevent the PTC heater from overheating during operation of the PTC heater, and wherein the controller is further programmed to operate the door to adjust the opening degree of the hot air path between the open state and the closed state in response to the controller determining that the PTC heater is not operating.

2. The air conditioning system of claim 1, further comprising a detector configured to detect an on-state and an off-state of the PTC heater, wherein the detector includes a voltage sensor for detecting whether a voltage is applied to the PTC heater, the detector outputting a heater-on signal to the controller indicating the PTC heater is operating upon detecting a voltage and outputting a heater-off signal to the controller indicating the PTC heater is not operating based on the determination that no voltage is detected.

3. The air conditioning system of claim 1, wherein the controller is configured to operate the door to adjust the opening degree of the hot air path to the closed state when the PTC heater is not operating.

4. The air conditioning system of claim 1, wherein application of a pulse width modulation (PWM) duty ratio to the PTC heater results in operation of the PTC heater to generate heat corresponding to a predetermined target heating temperature.

5. The air conditioning system of claim 1, wherein:
    the hot air path includes a driver-seat-side hot air path supplying hot air toward a driver seat and a passenger-seat-side hot air path supplying hot air toward a passenger seat;
    the door includes a driver-seat-side door controlling an opening degree of the driver-seat-side hot air path and a passenger-seat-side door controlling an opening degree of the passenger-seat-side hot air path; and
    the controller is configured to operate the driver-seat-side door and the passenger-seat-side door so a predetermined first opening degree of the driver-seat-side door and the passenger-seat-side door in a single mode in which the driver-seat-side door and the passenger-seat-side door are simultaneously controlled differs from a predetermined second opening degree of the driver-seat-side door and the passenger-seat-side door in a dual mode in which the driver-seat-side door and the passenger-seat-side door are independently controlled.

6. The air conditioning system of claim 5, wherein the controller is configured to operate the driver-seat-side door and the passenger-seat-side door so the predetermined first opening degree of the driver-seat-side door and the passenger-seat-side door in the single mode is larger than the predetermined second opening degree of the driver-seat-side door and the passenger-seat-side door in the dual mode.

7. The air conditioning system of claim 5, wherein the controller is configured to increase a rotation speed of a blower by a predetermined rotation speed value in response to one of a temperature of a drive-seat-side portion of the PTC heater corresponding to the driver-seat-side hot air path and a temperature of a passenger-seat-side portion of the PTC heater corresponding to the passenger-seat-side hot air path is equal to or higher than a predetermined reference temperature.

8. An air conditioning system for a motor vehicle, comprising:
    a first door configured to adjust a first opening degree of a first hot air path between a first open state and first closed state;
    a second door configured to adjust a second opening degree of a second hot air path between a second open state and a second closed state;
    a positive temperature coefficient (PTC) heater configured to heat air introduced into the first hot air path and the second hot air path; and
    a controller configured to independently operate the first door and the second door to adjust the first opening degree of the first hot air path between the first open state and the first closed state and the second opening degree of the second hot air path between the second open state and the second closed state, wherein the controller is programmed to limit a member of the group selected from the first door, the second door, and combinations thereof to a predetermined opening degree so that the respective door can only adjust the respective opening degree of the respective hot air path between the respective open state and the predetermined opening degree in response to the controller determining that the PTC heater is operating, wherein the predetermined opening degree allows a predetermined amount of air to be introduced into the respective hot air path to prevent the PTC heater from overheating, and wherein the controller is also programmed to allow the first door to adjust the first opening degree of the first hot air path between the first open state and the first closed state and the second door to adjust the second opening degree of the second hot air path between the second open state and the second closed state in response to the controller determining that the PTC heater is not operating.

9. The air conditioning system of claim 8, wherein the controller is configured to limit the first door to the predetermined opening degree so that the first door can only adjust the first opening degree of the first hot air path between the first open state and the predetermined opening degree, wherein the predetermined opening degree allows the predetermined amount of air to be introduced into the first hot air path to prevent the PTC heater from overheating.

10. The air conditioning system of claim 8, wherein the controller is configured to limit the first door to a first predetermined opening degree so that the first door can only adjust the first opening degree of the first hot air path between the first open state and the first predetermined opening degree, the controller is configured to limit the second door to a second predetermined opening degree so that the second door can only adjust the second opening degree of the second hot air path between the second open state and the second predetermined opening degree, and the first predetermined opening degree and the second predetermined opening degree allow the predetermined amount of air to be introduced into the first hot air path and the second hot air path to prevent the PTC heater from overheating.

11. The air conditioning system of claim 8, wherein:
the first door is a driver-seat-side door;
the first hot air path is a driver-seat-side hot air path;
the second door is a passenger-seat-side door; and
the second hot air path is a passenger-seat-side hot air path.

12. A control method of an air conditioning system for motor vehicles, the air conditioning system including a door configured to adjust an opening degree of a hot air path between an open state and a closed state and a positive temperature coefficient (PTC) heater configured to heat air introduced into the hot air path, the method comprising the steps of:
a) determining whether the PCT is operating or is not operating; and
b) controlling operation of the door to adjust the opening degree of the hot air path between the open state and the closed state, wherein the controlling is performed by a controller programmed to operate the door to adjust the opening degree of the hot air path between the open state and a predetermined opening degree in response to the determination that the PTC heater is operating during the determining step, wherein the predetermined opening degree allows a predetermined amount of air to be introduced into the hot air path to prevent the PTC heater from overheating during operation of the PTC heater, and wherein the controller is further programmed to operate the door to adjust the opening degree of the hot air path between the open state and the closed state in response to the determination that the PTC heater is not operating during the determining step.

13. The control method of claim 12, wherein operation of the door is controlled so that the opening degree of the hot air path is in the closed state when the PTC heater is not operating.

14. The control method of claim 12, wherein the step b) further comprises the steps of:
determining whether the air conditioning system is in a single mode in which a driver-seat-side door and a passenger-seat-side door are simultaneously controlled or in a dual mode in which the driver-seat-side door and the passenger-seat-side door are independently controlled; and
changing the predetermined opening degree of the driver-seat-side door and the passenger-seat-side door depending on whether the air conditioning system is in the single mode or in the dual mode.

15. The control method of claim 12, wherein the step b) further comprises the steps of:
comparing a temperature of a driver-seat-side portion of the PTC heater heating air blown toward a driver seat and a temperature of a passenger-seat-side portion of the PTC heater heating air blown toward a passenger seat to find a higher one of the temperature of the driver-seat-side portion of the PTC heater and the temperature of the passenger-seat-side portion of the PTC heater;
determining whether the higher one of the temperature of the driver-seat-side portion of the PTC heater and the temperature of the passenger-seat-side portion of the PTC heater is equal to or higher than a predetermined reference temperature; and
increasing a rotation speed of a blower by a predetermined rotation speed value if the higher one of the temperature of the driver-seat-side portion of the PTC heater and the temperature of the passenger-seat-side portion of the PTC heater is equal to or higher than the predetermined reference temperature.

* * * * *